No. 665,272. Patented Jan. 1, 1901.
W. SCHENDEL.
NUT LOCK.
(Application filed May 7, 1900.)
(No Model.)

Witnesses

Inventor
Wilhelm Schendel
By R. S. & A. B. Lacey
his Attorney

THE NORRIS PETERS CO., PHOTO-LITHO., WASHINGTON, D. C.

United States Patent Office.

WILHELM SCHENDEL, OF BEARDSTOWN, ILLINOIS.

NUT-LOCK.

SPECIFICATION forming part of Letters Patent No. 665,272, dated January 1, 1901.

Application filed May 7, 1900. Serial No. 15,795. (No model.)

*To all whom it may concern:*

Be it known that I, WILHELM SCHENDEL, a citizen of the United States, residing at Beardstown, in the county of Cass and State of Illinois, have invented certain new and useful Improvements in Nut-Locks; and I do hereby declare the following to be a full, clear, and exact description of the invention, such as will enable others skilled in the art to which it appertains to make and use the same.

This invention has relation to devices for preventing the loosening of nuts upon bolts after being tightened; and it consists of the novel features and details of construction set forth at length in the annexed specification.

The primary object of the invention is the provision of a device in the nature of an attachment to be used in connection with any bolt and nut to secure the latter when properly positioned, the locking means being capable of ready application to the proper-sized bolt without marring it in any wise and adapted to be detached and used again.

For a full description of the invention and the merits thereof and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1:
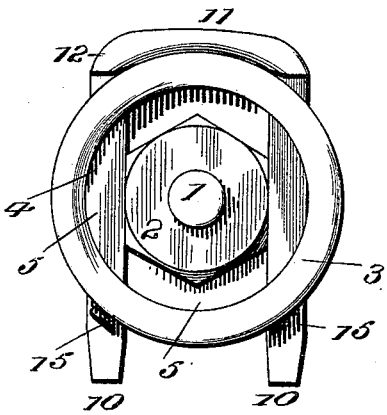
Figure 2:
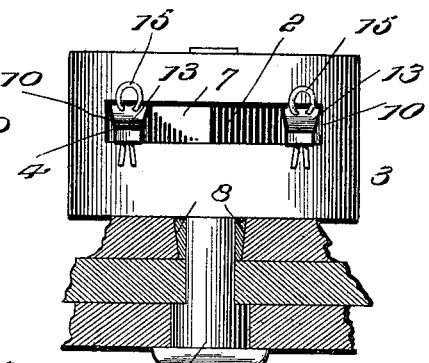
Figure 3:
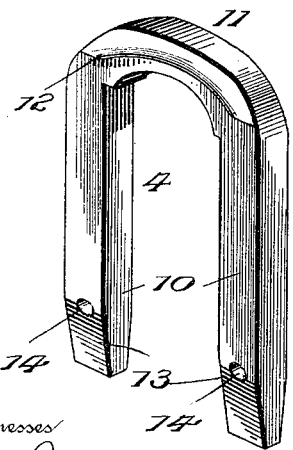
Figure 4:
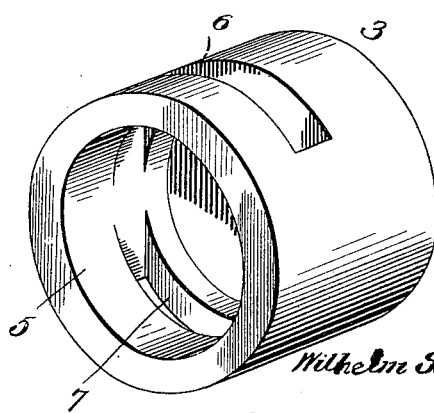

Figure 1 is a detail view in elevation, showing the application of the invention. Fig. 2 is a detail view, parts being broken away. Fig. 3 is a detail perspective view of the yoke. Fig. 4 is a detail perspective view of the washer.

Corresponding and like parts are referred to in the following description and indicated in all the views of the drawings by the same reference characters.

The bolt 1 and nut 2 coöperating therewith are of ordinary construction and are illustrated to show the manner of utilizing the invention.

The means for locking the nut consist of a washer 3 and yoke 4. The washer has an opening to receive the threaded portion of the bolt 1, upon which it is adapted to move freely, and its outer face is provided with a recess 5, adapted to receive the nut 2 and yoke 4, the latter passing through slots formed in opposite sides of the rim portion of the washer and intersecting with the recess 5. The slot 6 in one side of the washer is in line with the companion slot 7 in the diametrically opposite side, and these slots 6 and 7 are of such relative size as to receive the yoke 4, which passes therethrough and embraces opposite sides of the nut 2. The washer is prevented from turning upon the bolt 1 by rear projections 8, which enter the part to which the bolt is fitted, and in the event of said part being a fishplate the latter will be formed with openings disposed so as to receive the projections 8. Within the scope of the invention any means may be resorted to for preventing rotation of the washer when fitted in place. In the event of the part against which the washer bears being of wood the projections 8 will become embedded therein and secure the washer against turning.

By having the washer recessed in its outer face it forms a housing for the nut and securing means for the yoke 4. The yoke 4 comprises spaced parallel members 10, connected at one end by a cross-piece 11, having a lateral extension 12 to overlap the slot 6 and limit the movement of the yoke in one direction and provide a grip to facilitate removal of the yoke when required. The members 10 are beveled slightly at their lower ends, as shown at 13, so as to readily pass over the nut 2 when placing the yoke in position after the nut has been screwed up tight. Openings 14 are formed in the members 10 to receive split pins or keys 15, which prevent the casual displacement of the yoke when positioned. The yoke may be cast or struck up from plate metal, and the washer is preferably cast, the bolt-opening and the slots, as well as the recess, being cored.

After the bolt 1 has been properly fitted to the part to be secured thereby the washer 3 is slipped thereon and the nut 2 placed upon the threaded end of the bolt and screwed home. The yoke 4 is now placed in position by having its members 10 thrust through the slots 6 and 7 and passing upon opposite sides of the nut 2. When the yoke is in place, the nut is prevented from loosening, and to guard against the accidental displacement of the yoke the keys 15 are fitted thereto in the manner stated.

The nut 2 is housed and protected by being seated in the recess 5 of the washer 3, and the lateral extension of the cross-piece 11 of the lock-yoke overlaps the portion of the washer adjacent to the topmost slot 6 and sheds water and prevents foreign matter entering the recess 5 from this point. By having the nut housed in the manner stated it is protected from inclement weather and from being tampered with. Hence the efficiency and usefulness of the fastening are materially increased.

Having thus described the invention, what is claimed as new is—

In combination, a bolt, a washer slipped loosely upon the bolt and having rear projections to enter the part against which the washer is placed to prevent turning of the washer, and having a recess in its outer face and oppositely-disposed slots in its sides intersecting the said recess, a nut threaded upon the bolt and received in the recess of the washer and housed thereby on all sides, a yoke thrust through the slots of the washer and having its legs embracing opposite sides of the nut, and having its cross-piece extended laterally to overlap the topmost slot of the washer to exclude foreign matter, and split pins fitted to the projecting ends of the legs of the yoke, substantially as described.

In testimony whereof I affix my signature in presence of two witnesses.

WILHELM SCHENDEL. [L. S.]

Witnesses:
 JOHN C. BANJAN,
 A. R. MEYER.